Sept. 23, 1969 A. A. KNOX 3,468,490

CONTINUOUS LOOP RECORDING TAPE CARTRIDGE

Filed March 16, 1966 6 Sheets-Sheet 1

INVENTOR.
*Austin A. Knox*
BY
*Blair, Buckles + Cesari*
ATTORNEYS

Sept. 23, 1969 A. A. KNOX 3,468,490

CONTINUOUS LOOP RECORDING TAPE CARTRIDGE

Filed March 16, 1966 6 Sheets-Sheet 2

United States Patent Office 3,468,490

Patented Sept. 23, 1969

3,468,490

CONTINUOUS LOOP RECORDING TAPE CARTRIDGE

Austin A. Knox, 143 Crystal Lake Road, Stamford, Conn. 06905

Filed Mar. 16, 1966, Ser. No. 534,796
Int. Cl. B65h *17/48*; G11b *5/00*
U.S. Cl. 242—55.19 8 Claims

ABSTRACT OF THE DISCLOSURE

The disclosure is of a continuous tape recording cartridge having means for reducing the friction in the wound tape mass. There is provided a sloping lower sidewall of the cartridge hub which is at a greater angle from the vertical than the slope of the upper portion of the hub, permitting the inner turns of tape to ride up into a truncated cone to accommodate variations in tape length and to reduce friction. There is also disclosed tape cartridge hubs having variable diameters to accommodate changes in the tape length and to reduce friction. These embodiments disclosed have hub segments which are either radially movable in response to tightening or loosening of the tape to change the effective hub diameter in response thereto.

This invention relates to a cartridge for continuous loop recording tape and more particularly to a tape cartridge having reduced and relatively constant turn-to-turn friction in the wound tape mass under varying ambient conditions.

In general, cartridges for holding continuous loop recording tape for the transport of the tape and the recording or reproducing of information onto or from it have been known for a number of years. In particular, tape cartridges are now in wide use wherein a magnetizable tape is wound on a rotatable hub, the tape mass resting on a flat rotatable flange, with the tape ends spliced together to form a continuous loop with a portion of the loop passing around guides in the cartridge for presentation along one side of the cartridge and for engagement with a tape transport assembly and a transducer head. Such recorder tape cartridges are disclosed in U.S. Patents Nos. 3,126,163, 2,778,880, and 2,992,642.

In continuous tape cartridges the tape is pulled from the innermost turn around the hub, through tape guides and across side of the cartridge and then rewound on the exterior of the tape mass. A principal problem encountered in such tape cartridges has been turn-to-turn friction within the tape mass. There is a continually increasing frictional retarding force between adjacent turns of tape as a section of tape progresses toward the hub and the turns are of smaller and smaller diameter. It had been thought heretofore that this turn-to-turn friction loss in the tape mass would be reduced by the use of lubricated tape, i.e., tape with a magnetizable oxide coating on one side and with a relatively thick coating of lubricant such as graphite on the other side. Lubricated tape is not only expensive (two to three times the cost of nonlubricated tape) but as the lubricant wears off, the turn-to-turn friction and total tape tension increases. This puts a greater load on the tape transport system and may affect reproductive quality because of the unevenness of tape tension, tape transport slippage, or because of stretching of the tape.

A further problem with cartridges using lubricated tape is that it is difficult to maintain uniform thickness of the lubricant coating over the length of the tape, resulting in variations in total tape mass diameter as the unevenly coated sections of tape move from the outer to the inner turns of the tape mass and creating tension variations in the tape as it is pulled through the tape transport. As wear occurs there is an uneven loss of tape lubricant and this variation in tape lubricant thickness plus increasing tension, because of loss of lubricant, results in a cascading effect that rapidly increases the flutter of recorded material on the tape.

Another problem in continuous loop recording tape cartridges results from variations in tape length due to changes in ambient conditions or because of slight stretching of the tape through use. When the tape is wound around the reel hub it cannot be excessively loose since relatively wide spaces between tape turns may result in a S loop, i.e., a doubling back of a portion of a turn of tape. As the doubled back tape portion advances toward the inner turns of the tape mass, turn-to-turn friction keeps increasing and the doubled back portion or S loop causes the cartridge to jam. To overcome these problems the tape should be wound around the cartridge hub with some degree of initial tightness.

With prior art tape hubs of constant effective diameter the tape tends to tighten or loosen about the hub depending on temperature and humidity conditions. Thus, if the tape decreases in length several inches the tightening effect will increase turn-to-turn friction in the cartridge. If the length of tape increases, the wound tape mass will then become too loose with the tendency to form an S loop as noted above. Either of these conditions may result in the jamming of the tape or the introduction of excessive strain on the tape and tape transport system.

A further problem in continuous loop recording tape cartridges is the turn-to-turn friction attributable to static electricity. With the continual sliding action of the tape as it advances through the wound tape mass and because the tape is made of polymeric material, a substantial amount of static electricity is generated which substantially effects turn-to-turn friction in the tape mass. Thus the turn-to-turn friction in the continuous loop recording tape cartridge is substantially affected by variations in tape length and by the amount of static electricity generated.

In some cartridges, the rotation of the hub and flange, either together or independently, poses further problems. Rotation of the hub introduces variables in the rate of tape feed and tape tension as it is pulled from around the hub since the hub is not perfectly round and does not rotate with perfect concentricity. Thus, the tape may be fed off the hub at a slightly varying linear rate and tension with the attendant introduction of wow and flutter into the signals being recorded or reproduced.

If the hub or flange wobbles, that is, moves in a vertical plane as it rotates in a horizontal plane, the inner diameter of the tape mass is continually changing, since the hub is outwardly angled toward its top. This changing diameter changes the friction between turns in a more or less sporadic manner and depending on the condition of the lubricating surface, looseness or tightness of tape wind, etc., will produce ranging degrees of wow and/or flutter in the recorded or reproduced material.

The rotating flange frictionally engaging the underside of the tape mass has also substantial inertia and momentum. Inadvertent movement or vibration of the cartridge may cause rotation of the flange which likely will move the tape mass. If this occurs, tape tangling may result. Further, the mass of the flange affects cueing and stopping time in broadcast applications since flange inertia and momentum must be overcome upon starting and stopping the tape. To overcome the problems of flange intertia and momentum, various braking systems have been employed in prior art cartridges, adding substantially to the cost of manufacture.

A further problem with prior art tape cartridges is in providing for even tape to transducer head contact pressure over the width of the tape. This is particularly important for multitrack tapes. One cause of this problem is that the tape is angularly turned to lay over the tape mass as it is pulled from the tape mass center to reduce cartridge height. The turned tape is then passed over a guide or guides including a corner post or roller to turn the tape to a position wherein it is parallel to the turns of tape in the tape mass for engagement with the transducer head and the tape transport capstan and pinch roller. The introduction of this nonlinearity and twisting of the tape as it is fed from inside the tape mass results in tape to head pressure differences from top to bottom over the tape width. Prior art attempts to compensate for differences in tape to head pressure generally require a pressure pad urged against the tape to keep the entire width of the tape firmly against the head surface, increasing tape tension in transport. When such greater tension is required however, head wear is increased and greater pinch roller pressure may be required to drive the tape, with more friction losses introduced into the transport system.

Prior art tape cartridges have also provided for the positioning of a pinch roller in the cartridge, either being permanently fixed in the cartridge or insertable from the tape deck into the cartridge through a relatively large opening in the cartridge case as shown in U.S. Patent No. 3,126,163. Providing a self-contained pinch roller for each cartridge adds substantially to the cost of manufacture and generally limits the quality of the pinch roller elastomer material. For those cartridges accommodating insertable pinch rollers, the pinch roller is usually brought up into the cartridge with arcuate movement of the pinch roller axis of rotation. Thus it is difficult to maintain even pressure between the pinch roller and capstan over the width of the tape since the pinch roller axis is urged toward the capstan in a vertical arc. Such variation of pressure from top to bottom of the tape causes the condition known as tape "wander," i.e., vertical movement of the tape as it is pulled in a horizontal plane. Further, such a tape transport system requires large holes in the tape cartridge case for entry of the pinch roller which permits the entry of dust and dirt into the cartridge and results in a very low useful packaging density factor.

Accordingly it is an object of this invention to provide a cartridge for a continuous recording tape having means for reducing turn-to-turn friction.

Another object of the invention is to provide a recording tape cartridge of the above character which does not require the use of lubricated tape.

Another object of the invention is to provide a recording tape cartridge of the above character having means for compensating for changes in tape length.

A further object of the invention is to provide a recording tape cartridge of the above character which reduces static electricity charges in the tape mass.

A further object of the invention is to provide a tape recording cartridge of the above character wherein the effective tape hub diameter is variable.

Another object of the invention is to provide a recording tape cartridge of the above character having a stationary hub.

A further object of the invention is to provide a tape recording cartridge of the above character having a rotating hub.

Another object of the invention is to provide a cartridge of the above character wherein the tape transport capstan drives the tape on its non-oxide side.

Another object of the invention is to provide a cartridge of the above character having a tape mass hub which causes the tape to ascend into a conical configuration as the tape moves through the tape mass toward the hub.

A further object of the invention is to provide a cartridge of the above character which is inexpensive to manufacture and reliable in operation.

Other objects of the invention will in part be obvious and will in part appear hereinafter.

The invention accordingly comprises the features of construction, combinations of elements, and arrangements of parts which will be exemplified in the constructions hereinafter set forth, and the scope of the invention will be indicated in the claims.

For a fuller understanding of the nature and objects of the invention, reference should be had to the following detailed description taken in connection with the accompanying drawings, in which.

Figure 1:
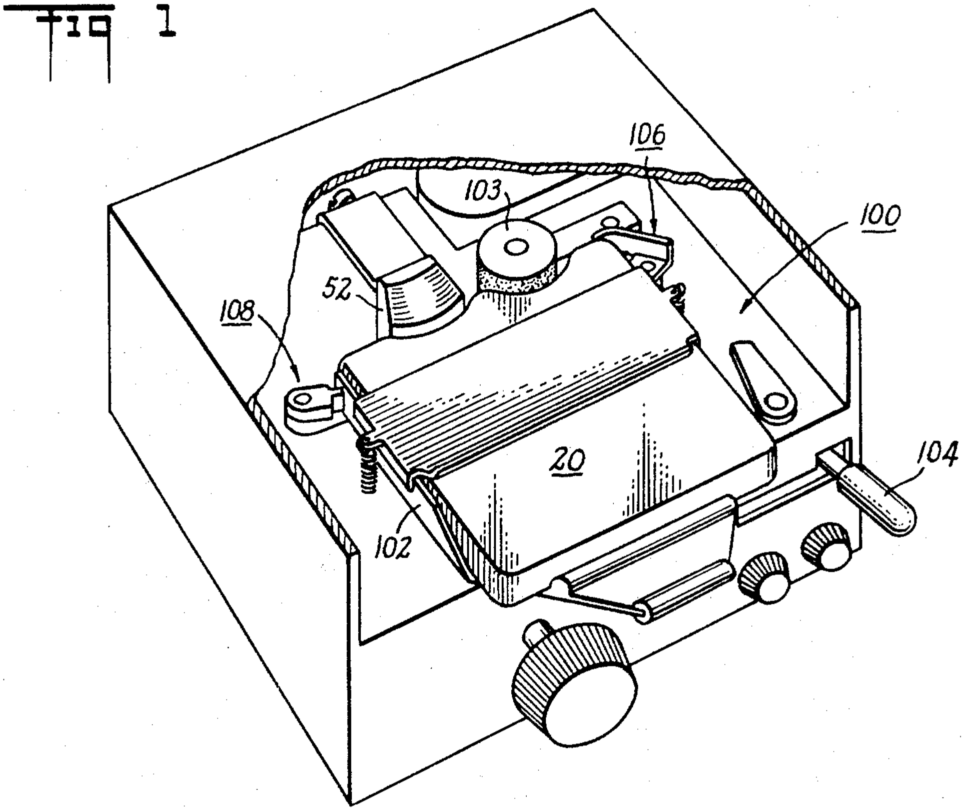
FIGURE 1 is a perspective view partially broken away of a tape cartridge of my invention in my recorder/reproducer.

As shown in FIGURES 5–8, one embodiment of my tape cartridge 20 for relatively short lengths of tape generally comprises top and bottom case portions 22, 24 respectively, having a stationary hub 26 which is formed by upper hub portion 28 and lower hub portion 30 which may be integral with case bottom 24. A continuous loop tape mass 32 is wound around the hub 26 with the loop portion 34 passing across the front side 36 of the case bottom 24 for a presentation and engagement with a tape transport and with one or more transducer heads.

Figure 2:
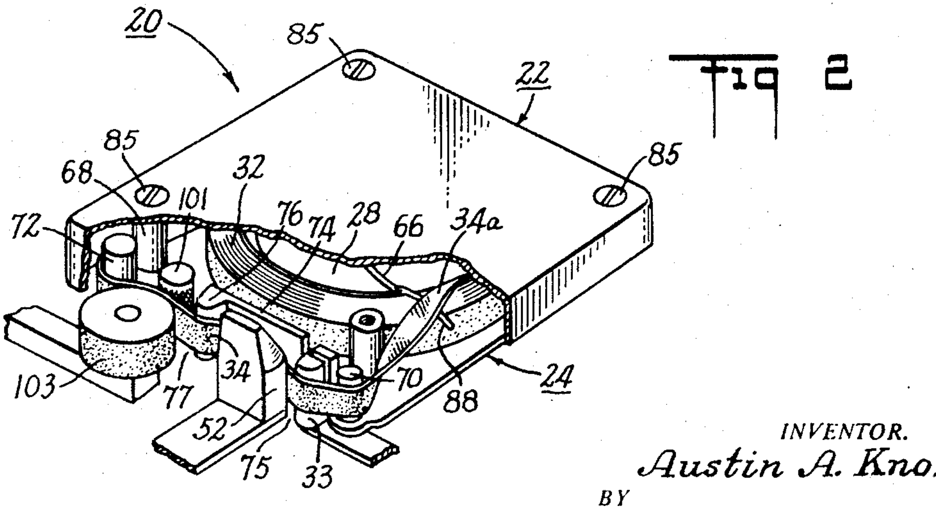
FIGURE 2 is a perspective view of a tape cartridge of my invention illustratively showing the relationship of the capstan, pinch roller, transducer head and tape guide to the cartridge tape loop.
Figure 3:
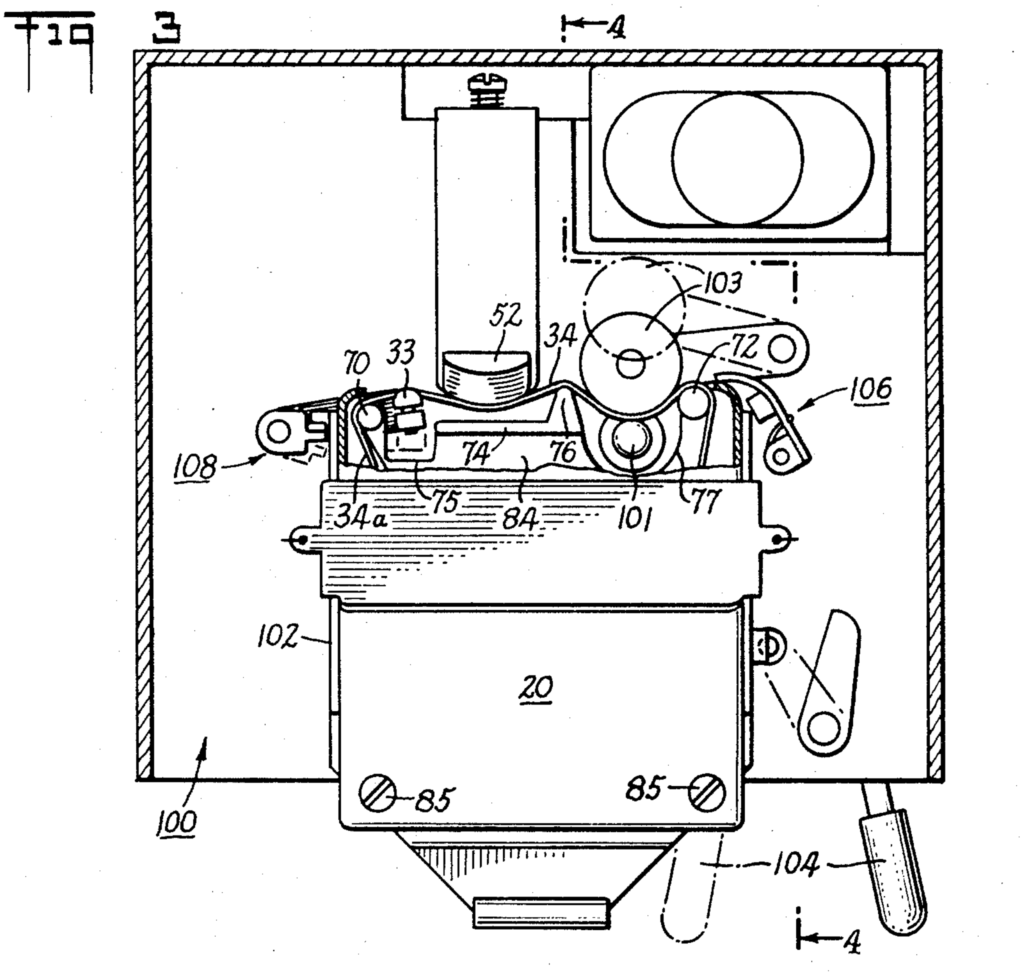
FIGURE 3 is a top view in partial section showing a tape cartridge of my invention inserted into and engaged with the transducer and tape transport of a recorder/reproducer of my invention.

As best seen in FIGURES 2 and 3, the tape loop 34 is pulled from around the hub 26 by a capstan 101, the tape being pressed against the capstan by pinch roller 103 having an exterior of elastomeric material. The tape is pulled past the transducer head 52 and is then wound around the exterior of the tape mass. The recorder/reproducer and tape cartridge 20 shown in FIGURES 1–4 may be used with any of the embodiments of my tape cartridge, as will be more fully explained hereinafter.

The continuous loop tape cartridge of my invention permits the use of nonlubricated recording tape, since turn-to-turn friction has been greatly reduced. The fidelity of recording and reproducing is enhanced by my cartridge construction, since excessive tape tension is not required in transport and the tape tension is kept uniform both linearly and across the width of the tape.

Figure 7:
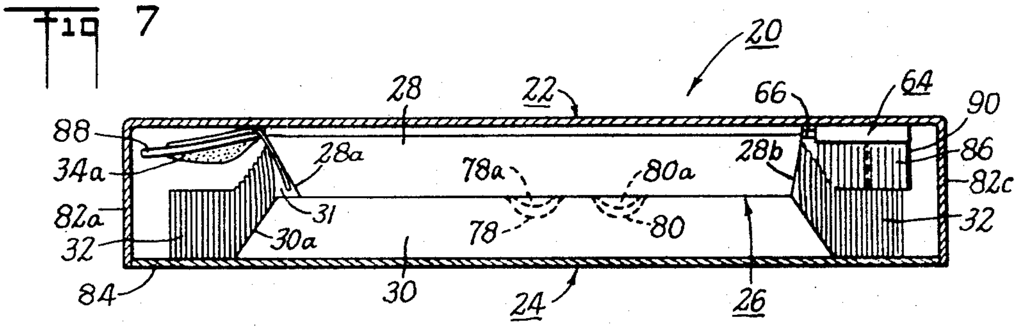
FIGURE 7 is a side view in partial section taken along lines 7—7 of FIGURE 6.
Figure 8:
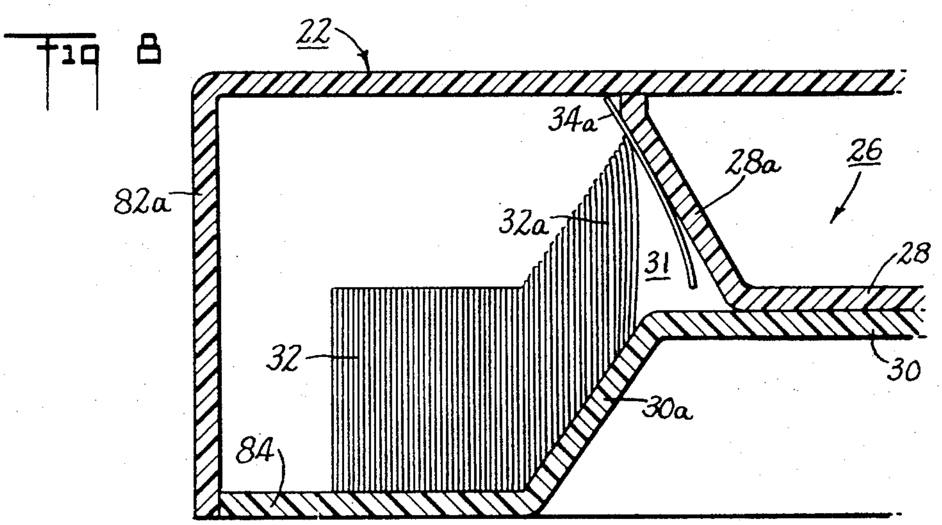
FIGURE 8 is an enlarged partial view in section taken along lines 8—8 of FIGURE 6.

As best seen in FIGURES 7 and 8, the reduction of turn-to-turn friction in the tape mass is accomplished by providing a hub wherein the outward angle of the sidewall of upper hub portion 28 at 28a is greater (tape exit area 31) than around the sidewall at 28b to permit the innermost turn of tape to slip more freely and evenly from around the hub as it is pulled therefrom by the tape transport. Further, the inwardly sloped circular sides 30a of lower hub portion 30 pushes the tape mass into a truncated conical configuration to progressively reduce the turn-to-turn area of frictional engagement as the tape progresses toward the hub center where turn-to-turn friction is greatest. This reduces the turn-to-turn contact area, reducing friction and tape tension as the loop 34 is pulled from the hub and as the tape progresses toward the hub. The outwardly sloped circular sidewalls 28a, 28b of upper hub portion 28 keeps the tape mass on the hub as the tape loop 34 is pulled from the hub.

Figure 9:
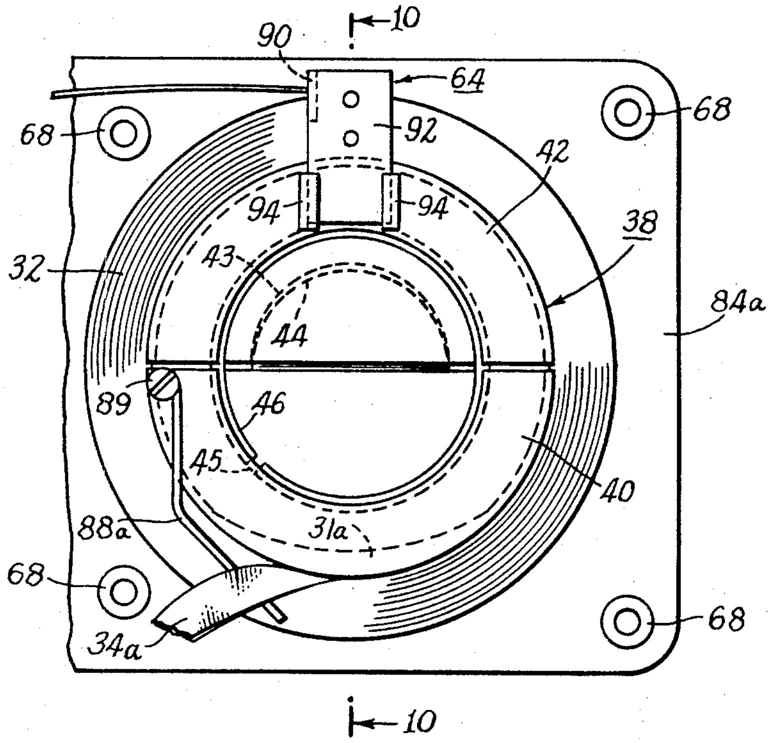
FIGURE 9 is a top partial view of another embodiment of my tape cartridge with the cover removed and which provides for changes in the effective hub diameter.
Figure 10:
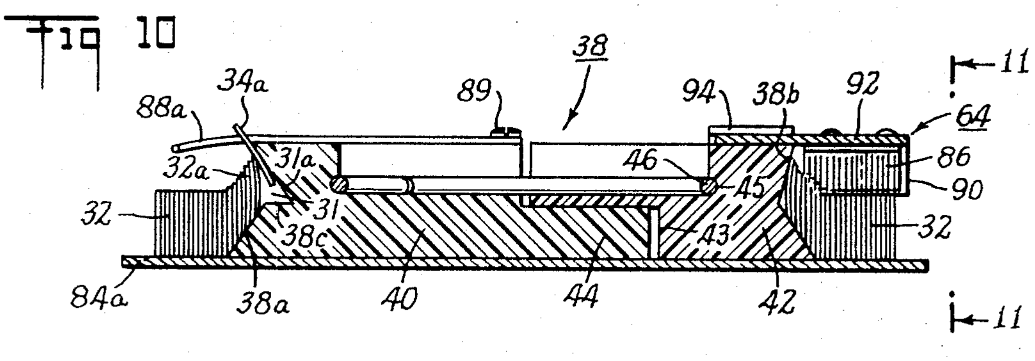
FIGURE 10 is a partial sectional view taken along lines 10—10 of FIGURE 9.
Figure 11:
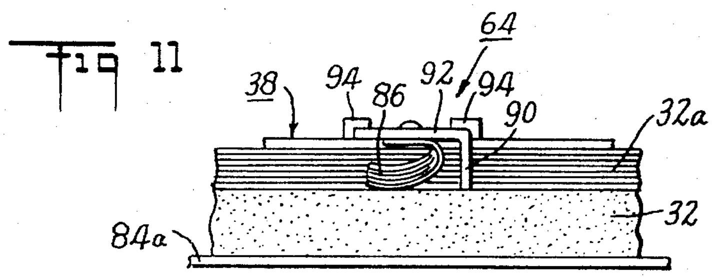
FIGURE 11 is a partial end view taken along lines 11—11 of FIGURE 10.

An alternate embodiment of the hub lower portion is shown in FIGURES 9–11, wherein the non-rotating hub 38 is formed of split sections 40 and 42 with section 40 being stationary and secured to the casing bottom 24 and with section 42 being movable toward and away from section 40. A spring wire 46 is held around the top of sections 40 and 42 to urge them apart to change the effective diameter of the hub 38 with changes in tape length.

As best seen in FIGURE 10, the split hub embodiment has the same increased outward angle at 31a to turn the tape and reduce friction as the tape exits from the tape mass. The lower circular sidewall 38a of both sections 40 and 42 is inwardly angled to urge the innermost turns of tape into a concial configuration to reduce the area of tape engagement and turn-to-turn friction. The upper circular sidewall 38b of section 42 is angled outwardly to retain the tape mass on the hub. The slope of side 38b continues around the hub into section 40 except for the increased outward angle in area 31a to form the plateau 38c and provide for a recessed area to reduce tape friction, facilitating exit of the tape from the innermost turn. Since section 40 is fixed against movement, the tape feeds from a stationary point and flutter and wow are accordingly reduced.

Figure 12:
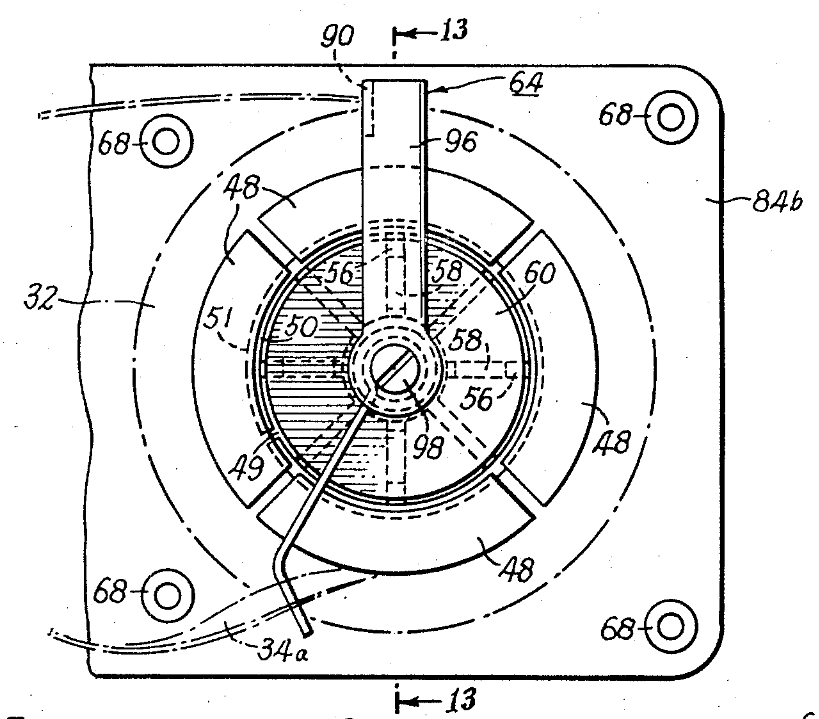
FIGURE 12 is a partial top view of another embodiment of a tape cartridge of my invention with the cover removed.
Figure 13:
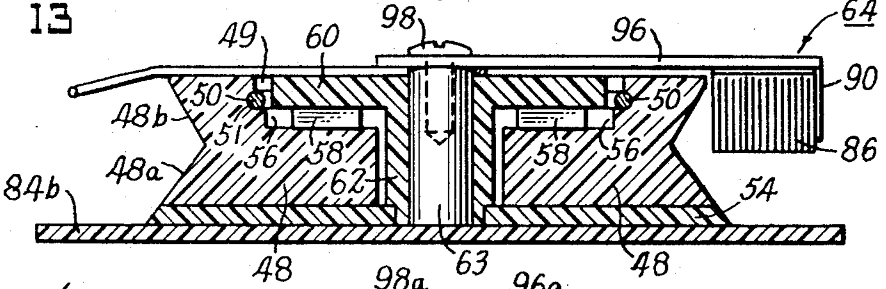
FIGURE 13 is an enlarged partial side view in section taken along lines 13—13 of FIGURE 12.

Another embodiment of my tape cartridge is shown in FIGURES 12 and 13 wherein the hub may be rotatable for longer lengths of tape and is formed of a plurality of circular hub segments 48 which are urged outwardly by spring wire 50. As shown, four hub segments 48 ride on a circular flange extension 54 into which sleeve 62 is secured. The segments 48 are radially guided by slots 56 which are engaged by keys 58 from the underside of retaining flange 60. The hub assembly is thus held down by retaining flange 60 and rotates about central pin 63 with the segments 48 radially movable to change the effective hub diameter in response to changes in tape length.

As best seen in FIGURE 13, the lower sidewall surfaces 48a of sections 48 are sloped inwardly to push the tape into a conical configuration about the hub as in the non-rotating embodiments. The upper sidewalls 48b of hub sections 48 are angled outwardly to retain the tape mass on the hub and to turn the tape as the innermost tape turn exits from around the hub. The angle of sidewalls 48b is comparable to that in the tape exit areas of the stationary embodiments since tape exits from around the whole hub in the rotating embodiments.

Figure 14:
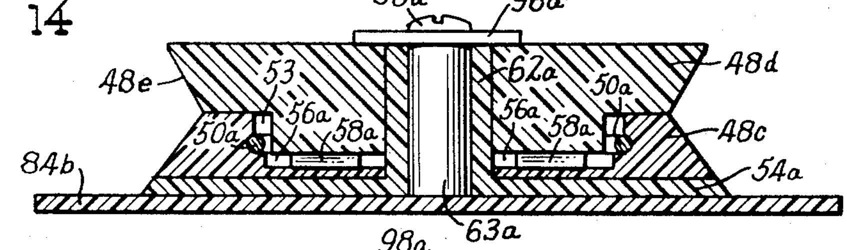
FIGURE 14 is a partial side view in section of an alternate embodiment of my tape cartridge which provides for changes in the effective hub diameter.

As shown in FIGURE 14, an alternate embodiment of my rotatable variable diameter cartridge hub is provided with segmented lower hub portions 48c being urged outwardly by spring wire 50a. The upper circular hub portion 48d retains the lower segmented portions and provides a tape exit surface on its sidewall 48e which remains at a constant diameter.

Figure 15:
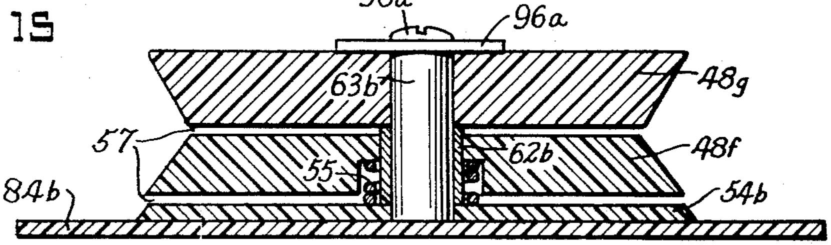
FIGURE 15 is a partial side view in section of a further alternate embodiment of my tape cartridge which provides for changes in the effective hub diameter.

The embodiment shown in FIGURE 15 also provides a rotatable hub having a variable effective diameter wherein the lower circular hub portion 48f is movable toward and away from circular upper hub portion 48g. A spring 55 urges lower hub portion 48f upwardly as the whole hub assembly rotates about the central pin 63b. Upper hub portion 48g is spaced from flange 54b by a sleeve 62b to provide freedom of vertical movement of lower hub portion 48f. Thus, in response to loosening or tightening of the tape mass, portion 48f moves vertically, the effective hub diameter being varied because of the sloped sidewalls of the hub which are spanned by the width of tape thereon.

In all embodiments turn-to-turn tape friction is reduced by urging the innermost turns of tape into a conical configuration thereby reducing the contact area of the tape from turn to turn. Also in all embodiments the tape bridges the upper and lower hub sidewalls, providing a relieved central area which permits the innermost turn of tape to slide more freely from the hub since the area of contact is limited to only the upper portion of the next adjacent turn. For even better tape friction characteristics, the embodiments shown in FIGURES 9–15 provide for changes in the effective diameter of the hub with tightening or loosening of the wound tape.

Figure 5:
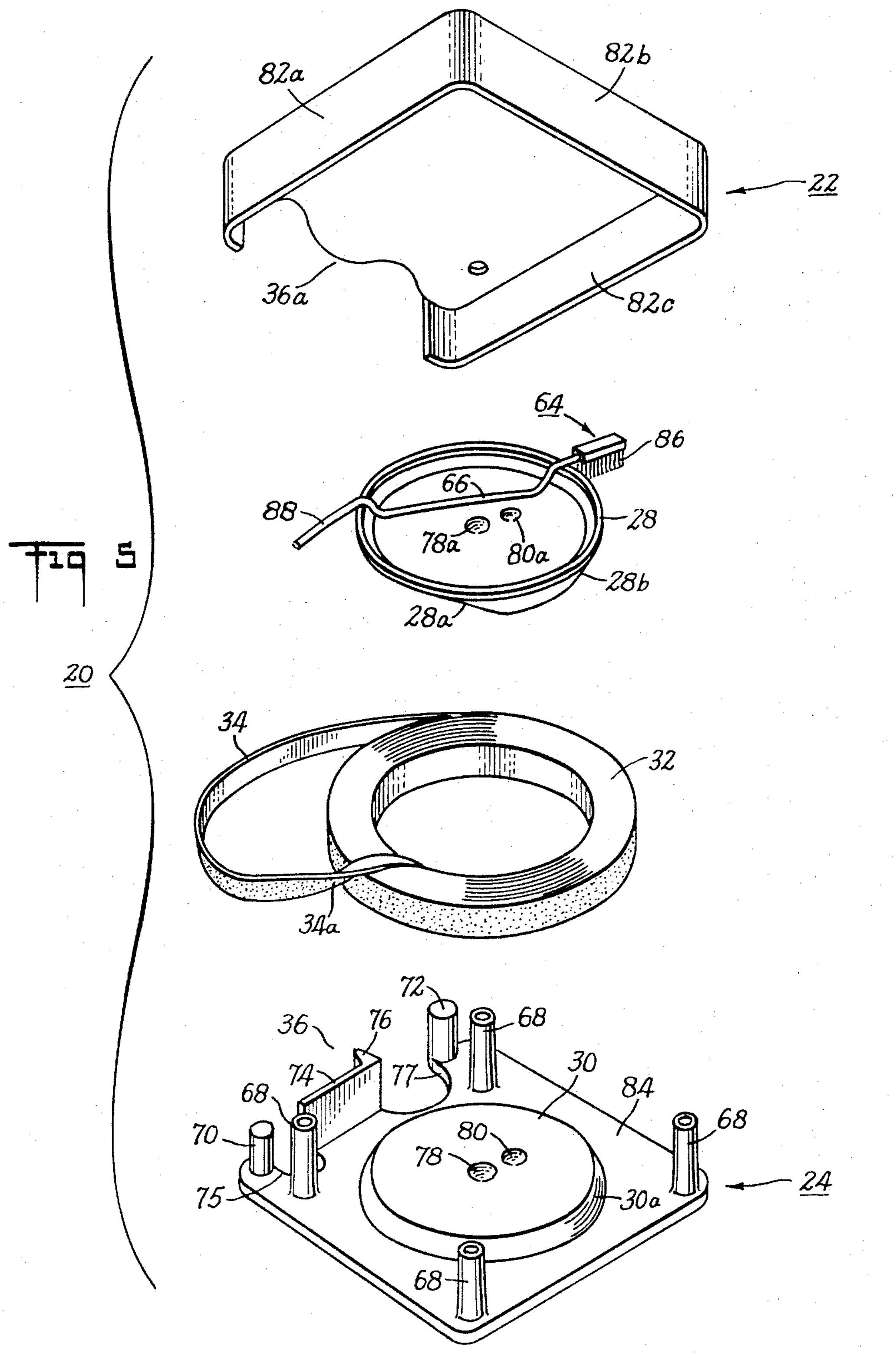
FIGURE 5 is an exploded perspective view of one embodiment of the tape cartridge of my invention.

I have found that static electricity should be removed from both the top and bottom of the tape mass to further reduce turn-to-turn friction. In all the embodiments and as shown in FIGURES 5, 11, and 13, a static electricity pickup assembly 64 is mounted adjacent the upper portion of the hub to slidably engage the top of the tape mass. Static electricity from assembly 64 is then drained off and is dissipated by the cartridge case which is coated with a conductive or semi-conductive material such as graphite. The bottom of the casing contacting the tape mass also provides a static electricity drain to the machine through the casing coating since the tape mass rests on the coated surface of the lower cartridge casing. Thus, when the cartridge is positioned in the machine there is a static drain path from both the top and bottom of the tape mass through the cartridge to the machine itself.

Figure 6:
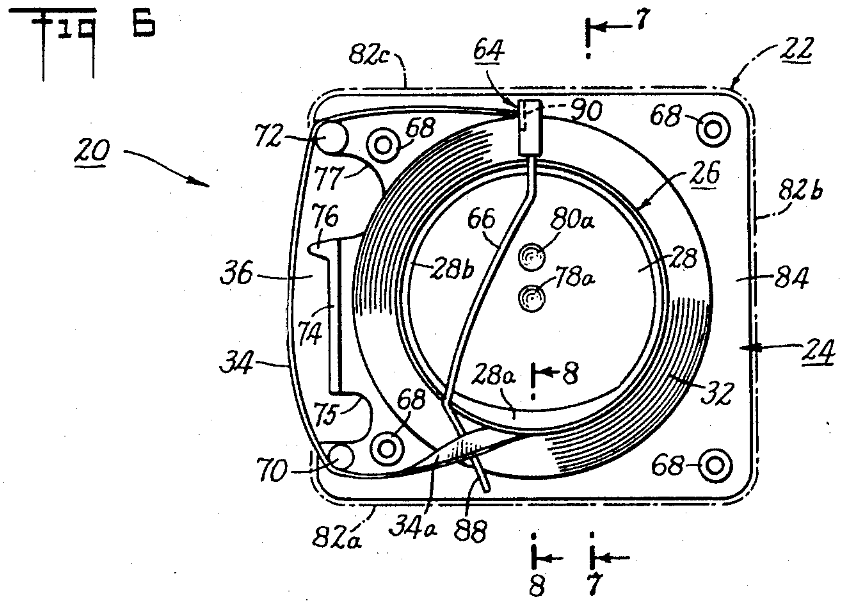
FIGURE 6 is a top view of the embodiment of the tape cartridge shown in FIGURE 5 with the cover removed.

Referring now to FIGURES 5–7, one embodiment of my tape cartridge will be more specifically described. Both the upper and lower case portions 22 and 24, respectively, and the hub 26 may be molded of plastic materials such as an acrylic or styrene. The lower case portion 24 has four posts 68 for positioning the upper case portion 22 as well as tape guide posts 70 and 72 molded integrally therewith along the front side 36. A partial front wall portion 74 is formed with a protruding tape guide bar 76 for positioning of the tape loop 34 against the transducer head when the cartridge is inserted into the machine. Lower case portion 24 also has formed therein two female indentions 78 and 80 for receiving the downwardly protruding male positioning lugs 78a and 80a of the upper hub portion 28.

As best seen in FIGURE 6, case bottom 84 has a cutout area 75 adjacent guide post 70 to permit insertion of a tape guide behind tape loop 34 when the cartridge is inserted into the recorder/reproducer. There is also provided a cutout 77 in the bottom 84 adjacent guide post 72 to permit insertion of the capstan up into the cartridge behind tape loop 34 when the cartridge is inserted into the recorder/reproducer. The positioning and movement of the tape cartridge as well as the engagement of the tape by the tape guide, capstan and transducer will be more fully explained hereinafter.

As shown in FIGURE 5, the upper casing portion 22 has three depending walls 82a, *b*, and *c* integrally molded therewith, with a cutout front portion 36a to permit engagement of the tape loop 34 with the transducer head and the capstan and pinch roller of the machine. Cover portion 22 thus encloses the cartridge except for the cut away frontal area 36a and may be secured in position by screws 85 (FIGURE 2) threaded into posts 68.

The static drain assembly 64 comprises a plurality of thin metal strips 86 which may be formed of .001 thick stainless steel being slitted to form a number of resilient strips which are urged against and trail over the rotating tape mass. Positioning wire 66 holds assembly 64 and is secured to upper hub portion 28 by adhesive or any other suitable means and is provided with an extension to form a wire guide 88 extending outwardly over the tape mass adjacent the hub tape exit area. The tape passes over wire guide 88 as it is pulled from around the hub as best seen in FIGURE 6. After securing upper hub portion 28 to the lower hub portion 30 and the securing of the static drain assembly 64, the entire hub and lower case portion is sprayed with an electrically conductive material such as graphite to form a static drain path from the assembly 64 to the under surface of the cartridge.

As best seen in FIGURE 6, the tape moves from the relieved area 31 of the hub over the wire guide 88, around guide post 70 and passes across the front portion 36 of the cartridge, and then around guide post 72 to be rewound on the exterior of the tape mass. To aid in even winding of the tape as it is wound on the outside of the tape mass, a guide bar 90 on assembly 64 depends downwardly therefrom to guide the tape downwardly and evenly onto the outside of the tape mass.

Referring now to FIGURES 7 and 8, it will be seen that the cartridge hub 26 about which the tape mass 32 is wound has a lower hub portion 30 with inwardly sloped sidewalls **30*a* to urge the inner turns of the tape mass 32 upwardly into a truncated conical configuration as shown at 32*a*. This reduces the area of tape contact from turn-to-turn in the tape mass near the cartridge hub where the friction in prior art cartridges has been greatest. I have found that the inward slope of circular sidewall 30*a*** should be from about 30 to 60 degrees from the vertical, with a 35 degree slope giving excellent results. Ideally, the lower hub portion may be made with an inward slope extending from the outermost turns of the tape mass to the hub center, but because of the desirability of limiting the height of the cartridge for consumer applications, the embodiment shown in FIGURES 7 and 8 is preferred.

The upper hub portion 28 has a circular sidewall **28*b* which is angled outwardly at an angle of from about 10 to 15 degrees from the vertical except in the area 31 wherein the wall 28*a* has an outward angle of from 20 to 40 degrees to turn the tape and to provide a recessed area 31*a* into which the innermost turn of tape may slip as it is pulled from around the hub in the tape exit area 31. As best seen in FIGURE 8, the tape bridges the central hub area and there is frictional engagement of the exiting turn of tape 34*a* with only the upper portion of the next adjacent turn, thus reducing tape tension as tape loop 34** is pulled smoothly and evenly from around the hub.

As seen in FIGURES 7 and 8, the dimensions of the upper and lower hub portions 28 and 30 will be determined by the width of the recording tape. For tape that is one-quarter inch wide I have found that the overall height of the hub should be about ⅜ to ½ inch, with the height of the upper hub portion 28 being somewhat greater than the height of lower hub portion 30. Since the outwardly angled sidewalls **28*a* and 28*b* retain the tape mass on the hub, the height and diameter of the upper rim of portion 28 must be great enough to prevent the spilling of tape from around the hub as it is moved up into a conical configuration against the inwardly sloped lower sidewall 30*a*. Thus for one-quarter inch recording tape the vertical distance between any point along the sloped side 30*a* to a point on the sidewall 28*a* or 28*b* of the upper hub portion must exceed one-quarter inch to prevent the tape from spilling from the hub. Although the hub 26**, as shown in FIGURES 5–8, is made as upper and lower hub portions and then joined together upon assembly, it should be understood that the invention is not so limited, but is preferred to facilitate molding and assembly of the hub.

Referring now to FIGURES 9–11, the embodiment of my tape cartridge with a non-rotating hub of variable effective diameter will be described more specifically. As best seen in FIGURE 10, the split hub 38 is also provided with a lower inwardly angled sidewall **38*a* and an upper outwardly angled sidewall 38*b* with an increased outward angle in the tape exit area 31 to form recessed area 31*a* as in the FIGURES 5–8 embodiment. The reduction of turn-to-turn friction by the urging of the tape mass 32 into a conical configuration 32*a* adjacent the hub and the reduced friction against the innermost turn 34*a*** as it is pulled from around the hub is accomplished in the same manner as that of the FIGURE 5–8 embodiment described above.

To compensate for changes in tape length, however, the non-rotating hub 38 is split into a stationary portion 40 which is secured to or molded integrally with the casing bottom 24. Laterally movable hub portion 42 is also molded of a plastic material and has a recess 43 which is loosely fitted over semi-circular plateau 44 for sliding movement toward and away from stationary hub member 40 to change the effective hub diameter. A groove 45 is formed around an inner well in the top of hub members 40 and 42 to contain a spring wire 46 which urges the hub members 40 and 42 apart as the tape mass 32 is rotated about the hub. The tape mass 32 is initially wound and dropped onto hub 38 with the hub portion 40 and 42 at least somewhat apart, but with tension on spring 46. Thus, if the tape mass is placed on the hub under "average" ambient conditions of temperature and humidity, the effective hub diameter may increase or decrease from its initial dimension with changes in tape length. As shown in FIGURE 10 the tape mass 32 rotates on the casing bottom **84*a***.

In the embodiment shown in FIGURES 9–11, the static electricity pickup assembly 64 comprises a positioning arm 92 having resilient metal strips 86 attached to its underside which ride over the top of the rotating tape mass. Brackets 94 may be secured to one or more hub portions for receiving arm 92 and positioning the assembly 64. As in the FIGURE 5–8 embodiment, the leading edge of the assembly 64 has a downwardly depending tape guide bar 90 for engaging the tape as it is wound on the outside of the tape mass. After assembly and before the tape mass is placed around the hub assembly 38 the assembly 64 and the casing bottom 24 are all sprayed with a conductive material such as graphite to form a static electricity path to ground from both the top and bottom of the tape mass when the cartridge is inserted into the machine. It should be understood that any of the embodiments may alternatively have a case of electrically conducting material.

Referring now to FIGURES 12 and 13, the rotating hub embodiment comprises four 90 degree circular segments 48, all urged outwardly from the hub center by a spring wire 50 which is retained in groove 51 around hub well area 49. The hub rotates about center pin 63 with the segments 48 slidably resting on lower hub flange 54 which is secured to the hub sleeve 62 and rotates over casing bottom **84*b*. Upper retaining flange 60 may be integral with sleeve 62 and has four downwardly depending keys 58 all spaced 90 degrees from each other which slideably engage a key way 56 formed into the top surface of each segment 48. The segments 48 are thus urged radially outward by spring wire 50**, with the wound tape mass restraining outward movement. With changes in tape length the effective diameter of the hub will be changed accordingly in response to such changes.

The lower sidewalls **48*a* of segments 48 as shown in FIGURE 13 are angled inwardly to urge the tape mass adjacent the hub into a conical configuration, as in the non-rotating embodiments. Similarly, the upper sidewall 48*b* is angled outwardly to retain the wound tape mass and permit tape bridging at the center to reduce friction against the innermost turn of tape as it is pulled from around the hub. As seen in FIGURE 13, however, the angle of upper sidewall 48*b*** is the same all the way around the rotatable hub (20 to 40°) since the tape exits from all points on the hub.

In all of the hub embodiments the angular relationship of the hub sidewalls and the height of the lower and upper hub portions are comparable for a given tape width.

The static electricity pickup assembly 64 as in the above embodiments comprises a plurality of thin metal strips 86 which are urged against the top of the rotating tape mass, the strips 86 being held in position on a stationary arm 96 secured to center pin 63 by a screw 98. The static pickup assembly 64 and the hub assembly for this embodiment are also sprayed with a conductive or semi-conductive material such as graphite to provide a ground path from both the top and bottom surfaces of the tape mass to the machine when the cartridge is inserted therein. As in the above embodiments, a guide bar 90 extends downwardly from the arm 96 to guide the tape evenly onto the outside of the tape mass. A guide wire **88*a* is secured to hub portion 40 by screw 89** to aid in bringing up the tape as it exits from the innermost turn (FIGURES 9, 10).

In the embodiment shown in FIGURE 14, the upper hub portion **48*d* is secured to sleeve 62*a* for rotation about center pin 63*a*, and has depending keys 58*a* slidably engaging key ways 56*a* in lower hub portions 48*c*. The hub portions 48*c* are free to move radially on flange 54*a* and are urged apart by spring wire 50*a* which is secured in an arcuate relieved area 53. A retaining ring 96*a* which may be part of the static assembly support arm is secured to pin 63*a* by screw 98*a* to hold the hub assembly together. In response to tightening or loosening of the tape mass the segments 48*c*** will move radially to vary the effective hub diameter which is bridged by the tape.

In the embodiment of the cartridge hub shown in FIGURE 15, the vertically movable lower hub portion **48*f* is slidably positioned around sleeve 62*b* and is urged upwardly by coil spring 55 from flange 54*b* toward upper hub portion 48*g* to change the effective hub diameter in response to changes in tape length. In FIGURE 15 lower hub portion 48*f* is shown spaced from upper hub portion 48*g* in a central position as though there were tape wound on the hub. Both hub portions are solid circular truncated conical sections held apart by inward pressure of the tape mass. Sleeve 62*b* spaces upper hub portion 48*g* from flange 54*b* to provide spaces 57 on either side of lower hub portion 48*f* to provide freedom of vertical movement. The upper hub portion 48*g*, sleeve 62*b*, and flange 54*b* all rotate about center pin 63*b*, with lower hub portion 48*f* being carried at the same speed by the tape mass. As in the above embodiments the tape mass rests on the casing bottom 84*b* as it rotates. Either or both the upper and lower hub portions may be vertically movable to vary the hub diameter. In the embodiments shown in FIGURES 12–15, the tape mass rests and is rotatable on the casing bottom 84*b***.

Figure 4:
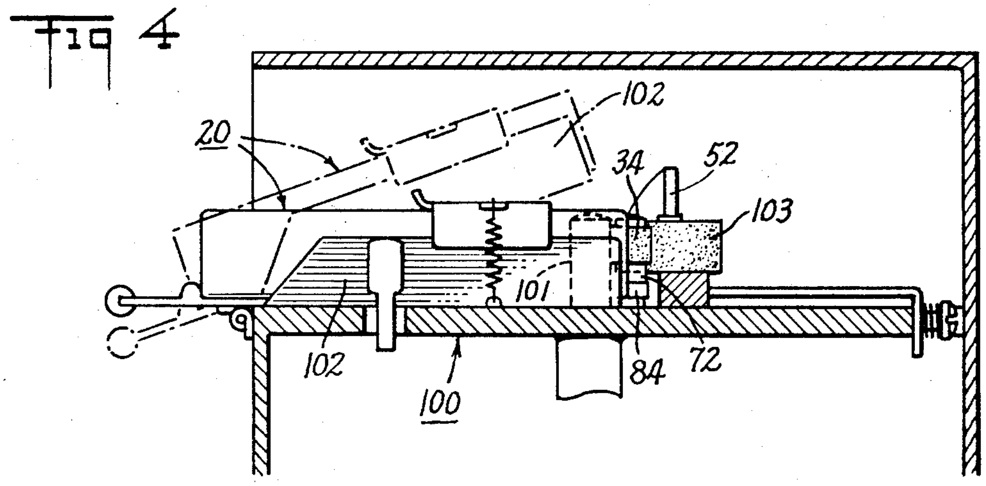
FIGURE 4 is a side sectional view taken along lines 4—4 of FIGURE 3.

Referring now ot FIGURES 1, 3 and 4, any of the embodiments of the tape cartridge of my invention are compatible with the recorder/reproducer of my invention which comprises a tape deck generally indicated at 100 having a hinged tilting tray 102 for holding a continuous loop tape cartridge 20 for engagement and disengagement with transducer head 52 as the tape is moved by the tape transport. As best seen in FIGURE 3, the capstan 101 and pinch roller 103 engage the tape loop 34 with the capstan driving the tape on its non-oxide side, reducing tape wear.

As shown in FIGURES 2 and 3, a movable tape guide 33 engages the tape to guide it and urge it against the transducer 52. The tape guide 33 and transducer are vertically movable relative to one another for the playing of multi-track tapes.

In operation the cartridge 20 is inserted into the tray 102 with the tray in its upper or dashed line position, as shown in FIGURE 4. When the cartridge is inserted fully into the tray, an interlock assembly 106 permits the tray to be urged downwardly into its solid line position shown in FIGURE 4. The cartridge tray is then dropped into position on the tape deck 100 by movement of lever 104 from left to right and further movement of the lever 104 in that direction causes the pinch roller 103 to move toward the capstan 101 from its dashed line position to its solid line position, as shown in FIGURE 3, thus drivingly engaging the tape loop 34. Tray locking assembly 108 (to hold the tray down firmly on the deck) and tape guide 33 are also actuated by lever 104, with tape guide 33 being urged into contact with the tape, as shown in FIGURE 3, to pull the tape against the transducer head and to position the tape vertically with respect thereto. Tape guide 33 has a sloped tape engaging surface to compensate for the twisting of the tape as it is pulled from around the hub. For use in prior art machines without such a compensating tape guide, cartridge guide post 70 is formed with a compensating tilt from the vertical to present the tape to the transducer with uniform tension from top to bottom.

Movement of lever 104 from left to right thus drops the tray into position with the tape loop over the capstan and tape guide and in front of the transducer and pinch roller, after which the tape guide and pinch roller engage the tape while the cartridge tray is locked onto the tape deck, and then the tape transport and sound reproducer systems are switched on by movement of lever 104 to its extreme right position.

To stop the machine and retract the tape cartridge the lever 104 is moved from right to left, as seen in FIGURE 1, which in reverse order opens switches (not shown) to stop the tape transport and open the sound reproducing circuits. Further travel of lever 104 to the left disengages the pinch roller and tape guide from the tape and releases the cartridge tray lock assembly 108. To remove the cartridge, the tray is again tilted to its upper position and tape loop 34 is lifted upwardly from the tape capstan transducer and tape guide, permitting cartridge removal.

The stationary hub of the FIGURE 5–8 embodiment has been found to be very satisfactory with tapes of about 50 feet or less in length. I have also found that for tape substantially longer than 50 feet, a hub having a variable effective diameter should be used as shown in FIGURES 9–11. For tape lengths of 300 feet or more, the rotating variable diameter hubs as shown in FIGURES 12–15 should be used. In some applications the rotating hubs as shown in FIGURES 12–15 may be held stationary to provide a non-rotating hub having a variable effective diameter. Further, it may be necessary to employ two or more static drain assemblies 64 on the top of the tape mass for long lengths of tape or if the tape is moving at a relatively high linear speed and generating more static electricity. In such cases it may also be desirable to apply a very thin coating of graphite or other conductive material to the tape to improve the static discharge path over the surface of the tape. The coating required for this purpose is much less than that for "lubricated" tape, and accordingly adds little to tape cost.

In all embodiments of the tape cartridge there is reduced turn-to-turn friction due to the conical configuration of tape near the hub and the draining of static electricity from both the top and bottom of the tape mass, makes possible the use of inexpensive non-lubricated tape. The embodiments having hubs of varying effective diameter reduce and maintain even more constant the turn-to-turn friction in the tape mass. In the embodiments having non-rotating hubs, the tape is pulled from a fixed point on the hub, eliminating feed variations and reducing manufacturing tolerance requirements. Tape tangling and jamming is also minimized since large, heavy flanges under the tape mass may be eliminated.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention, which as a matter of language, might be said to fall therebetween.

Having described my invention, what I claim as new and desire to secure by Letters Patent is:

1. A continuous loop recording tape cartridge comprising, in combination:

(A) a casing;

(B) a hub in said casing, (1) said hub having inwardly sloping lower sidewalls, and (2) outwardly sloping upper sidewalls, (3) the slope of both of said sidewalls being from the vertical;

(C) at least a portion of said hub having movable means for varying the effective diameter of said hub in response to changes in the length of tape in said tape mass as said wound tape mass is tightened and loosened in operation;

(D) a tape mas wound around said hub, (1) with a tape loop passing from the innermost turn adjacent said hub to the outermost turn on said tape mass, (2) the inner turns of said tape mass bridging across the juncture of said lower and upper sidewalls to provide a relieved area between the innermost turn of tape and said hub to facilitate sliding movement of the tape loop from around said hub; and (E) means forming an opening in said casing for engagement of said tape loop with tape transport and transducer means.

2. A continuous loop recording tape cartridge comprising, in combination:

(A) a casing;

(B) a hub in said casing, (1) said hub having inwardly sloping lower circular sidewalls to push wound tape into a truncated conical configuration about said hub, (2) said hub having an outwardly sloping upper circular sidewall for retaining a wound tape mass thereon, (3) said hub being secured against rotation in said casing whereby said tape mass rotates about said hub as tape is pulled from said hub from a stationary area thereon;

(C) a tape mass wound around said hub, (1) with a tape loop passing from the innermost turn adjacent said hub to the outermost turn on said tape mass, (2) the inner turns of said tape mass bridging across the juncture of said lower and upper sidewalls to provide a relieved area between the innermost turn of tape and said hub to facilitate sliding movement of the tape loop from around said hub; and (D) means forming an opening in said casing for engagement of said tape loop with tape transport and transducer means.

3. A continuous loop recording tape cartridge as defined in claim 2 wherein said hub is formed of a plurality of circular segments having means for resiliently urging at least one of said segments apart from a stationary segment and against the innermost turn of said tape mass whereby the effective hub diameter is varied by changes of tape length in said tape mass as said wound tape mass is tightened or loosened in operation.

4. A continuous loop recording tape cartridge as defined in claim 1 wherein said hub is formed of a plurality of circular segments having means resiliently urging said segments apart from one another and against the innermost turn of said tape mass, and means for rotatably mounting said circular segments whereby the effective hub diameter is varied by changes of tape length in said tape mass as said wound tape mass is tightened or loosened in operation.

5. A continuous loop recording tape cartridge as defined in claim 1, wherein there is provided static electricity pickup means contacting both sides of said wound tape mass, and grounding means on said cartridge for dissipating static electrical charges from said pickup means.

6. A continuous loop recording tape cartridge as defined in claim 4 wherein there is provided a rotatable hub flange having slidably mounted thereon a plurality of circular segments comprising said hub, a spring radially urging said circular segments apart, means for retaining said segments adjacent said hub flange and means mounting said hub flange for rotation as tape is pulled from the innermost turn of said tape mass, whereby the effective hub diameter is changed by radial movement of said hub segments in response to tightening and loosening of said tape mass.

7. A continuous loop recording tape cartridge as defined in claim 1 wherein said hub is formed of upper and lower hub portions, said lower hub portion being comprised of a plurality of circular segments mounted for radial movement and having resilient means urging said segments apart from one another and against the innermost turn of said tape mass, whereby the diameter of the upper hub portion remains constant while the effective diameter of the hub is varied in response to loosening or tightening of the tape mass by radial movement of said lower hub portion segments.

8. A continuous loop recording tape cartridge as defined in claim 1 wherein said hub comprises upper and lower hub portions, said hub portions being movable toward and away from one another, and resilient means urging said hub portions toward one another whereby the effective hub diameter is varied in response to tightening or loosening of said tape mass by said movement of said hub portions.

References Cited

UNITED STATES PATENTS

| | | | |
|---|---|---|---|
| 3,326,484 | 6/1967 | Yefsky. | |
| 2,318,316 | 5/1943 | Lawrence | 242—55.19 X |
| 2,778,635 | 1/1957 | Eash | 242—55.19 |
| 2,921,787 | 1/1960 | Cousino | 242—55.19 |
| 3,241,781 | 3/1966 | Knox | 242—55.19 |
| 3,257,084 | 6/1966 | Cole | 242—55.19 |
| 3,285,526 | 11/1966 | Moore | 242—55.19 |
| 3,289,964 | 12/1966 | Vito | 242—55.19 |
| 3,304,019 | 2/1967 | Myers | 242—55.19 |

BILLY S. TAYLOR, Primary Examiner

U.S. Cl. X.R.

179—100.2